(12) United States Patent
Ibaraki et al.

(10) Patent No.: US 6,577,813 B1
(45) Date of Patent: Jun. 10, 2003

(54) TRANSMITTING SYSTEM AND TRANSMITTING APPARATUS

(75) Inventors: Susumu Ibaraki, Sakai (JP); Toshikazu Hattori, Kadoma (JP); Hiroki Murakami, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/235,491

(22) Filed: Jan. 22, 1999

(30) Foreign Application Priority Data

Jan. 23, 1998 (JP) .......................... 10-011065
Dec. 28, 1998 (JP) .......................... 10-374271

(51) Int. Cl.$^7$ .......................... H04N 5/76; H04N 11/02
(52) U.S. Cl. .......................... 386/111; 348/423.1
(58) Field of Search .......................... 386/1, 27, 33, 386/40, 98, 111–112, 125, 126, 46; 369/47.1, 59.1, 59.23, 59.24, 59.26, 59.27, 60.01, 61, 124; 360/32, 39, 40, 48; 370/229, 230, 231, 235, 237, 253, 389, 392, 395, 400, 412, 413, 429, 463, 537; 348/423.1; H04N 5/26, 5/92, 9/79

(56) References Cited

U.S. PATENT DOCUMENTS 5,627,829 A 5/1997 Gleeson et al.
6,134,382 A * 10/2000 Mishima et al. ............ 386/111

FOREIGN PATENT DOCUMENTS

| JP | 57-4636 | 1/1982 |
| JP | 61-21652 | 1/1986 |
| JP | 2-20149 | 1/1990 |
| JP | 3-55936 | 3/1991 |
| JP | 04255187 | 9/1992 |

OTHER PUBLICATIONS

"Design Architecture for MPEG2 Transport Demultiplexor Assist", IBM Technical Disclosure Bulletin, vol. 39, No. 4, Apr. 1, 1996, pp. 283–286.
Patent Abstracts of Japan, vol. 098, No. 005, Apr. 30, 1998 & JP 10 023370 A (Sanyo Electric Co. Ltd), Jan. 23, 1998.
Database WPI, Section EI, Week 9912, Derwent Publications Ltd., London, GB; AN 99–138423, XP002100983& JP 11 007724 A (Victor Co of Japan), Jan. 12, 1999.

\* cited by examiner

Primary Examiner—Thai Tran
(74) Attorney, Agent, or Firm—Wenderoth, Lind & Ponack, L.L.P.

(57) ABSTRACT

A transmitting system which comprises a transmission line, a transmitting apparatus connected to the transmission line, and a receiving apparatus connected to the transmission line, and transmits data between the transmitting apparatus and the receiving apparatus, wherein the transmitting apparatus comprises packet compressing means which receives input data comprising plural packets having identifiers as an input, identifies packets to be discarded and effective packets according to the identifiers, and outputs compression information indicating the number of continuously discarded packets and the effective packets to the transmission line, and the receiving apparatus comprises packet restoring means which receives the compression information and the effective packets which have been output from the transmitting apparatus, generates ineffective, packets which are as many as the discarded packets, and outputs the ineffective packets and the effective packets.

6 Claims, 8 Drawing Sheets

MPEG-TS

MPEG-TS (204 Byte Mode)

TRANSMITTING SYSTEM AND TRANSMITTING APPARATUS

FIELD OF THE INVENTION

The present, invention relates to a transmitting system, apparatus, a recording and reproducing apparatus, and a recording apparatus, for transmitting/recording a stream comprising plural packets according to MPEG (Moving Picture Experts Group)2.

BACKGROUND OF THE INVENTION

It has been well known that a TS (transport stream) according to MPEG2 i , a stream comprising compressed digital video, compressed digital audio, and the like. The TS is used in digital broadcasting, and contains multiplexed plural programs. Hereinafter, "TS" always refers to the TS according to MPEG2 (MPEG2 TS). MPEG2 is defined in ITU-T H.222.0 (ISO/IEC 13818-1) "Generic Coding of Moving Pictures And Associated Audio Information".

FIGS. 3(a) and 3(b) show the TS. Shown in FIG. 3(a) are TS packets. The TS comprises a set of TS packets which are fixed in length (188 byte). The TS packets each includes plural fields, i.e., 8-bit Sync Byte, a 13-bit PID (Packet identifier), a 4-bit CC (Continuity Counter), an AF (Adaptation Field) (0–184 bytes), and a payload (0–184 bytes), and so forth. Information irrelevant to the present invention is not discussed herein. Information in respective fields of the TS packet will be discussed below.

The Sync Byte (8 bits) is positioned at the head of the TS packet, and is 0x47 (0x: Hexadecimal numeral), which is used for detecting the head of the packet.

The PID (13 bits) is used for identifying payload data. According to plural PIDs, plural programs contained in one TS can be identified PID-0x1fff indicates that the corresponding TS racket is an ineffective (null) packet.

The CC (4 bit) increases ore by one among the TS packets of the same PID. In some cases, neighboring TS packets of the same PID take the same CC value. They are called a "Duplicated Packet". When the Duplicated Packet is transmitted, two TS packets of the same content are sequentially transmitted.

The AF (0–184 bytes) is used for storing additional information.

The Payload (0 184 bytes) is used for storing actual data, the length of which is determined by the length of the AF.

In addition, the TS contains PCRs (Program Clock References) inserted at regular intervals. The PCR is information which a decoder at a receiving end uses so as to set the value of a reference time STC (System Time Clock) to the value intended by a transmitting end. Therefore, it is required that the PCR arrive at the receiving and at a timing as intended by the transmitting end.

When the TS is used in the digital broadcasting, as shown in FIG. 3(b), an error correction code is some times added after the TS packet. The typical code length of the error correction code is 16 bytes, and the TS packet and the error correction code (204 bytes in total) is transmitted as a unit. In some cases, the error correction code (16 byte) is dummy data.

A description will be given of a prior art transmitting system which transmits the TS described above.

One example of the prior art transmitting system is a system which adopts an adaptive clock system using an ATM (Asynchronous Transfer Mode). This is described in detail in Practical MPEG Text (P218–221), published by Aski Publishing Company FIG. 8 shows this prior art transmitting system. In FIG. 8, reference numerals 81, 82, 83, 821, 822, and 823 designate a transmitting apparatus, a receiving apparatus, a transmission line, receiving means, storage means, and PLL (phase-locked loop), respectively. The MPEG2 TS is input to the transmitting apparatus 81, the transmitting means 811 which transmits the input data to the transmission line 83. The transmission line 83 is an ATM network. When transmitting input data on the transmission line 83, some variance of delay occurs. The receiving means 821 of the receiving apparatus 82 receives data on the transmission line 83. The receiving means 821 stores the received data in the storage means 822. The storage means 822 is an FIFO (first-in, first-out) memory, and outputs the input data in synchronization with the output clock. The PLL 823 adjusts the speed of the output clock so that the amount of data stored in the storage means 822 is kept constant. To be specific, when the amount of stored data is larger than a predetermined value, the PLL 823 makes the speed of the output clock higher, while when the amount is smaller than the predetermined value, the PLL 823 makes the speed lower.

As described above, in the prior art transmitting system, although some variance of delay occurs on the transmission line 83, the PLL 823 and the storage means 822 of the receiving apparatus 82 make it possible to decode the data correctly However, in the prior art method, all the packets (programs) contained in the input data are transmitted even for the case where only a part of them needs to be transmitted. This makes it impossible to realize effective use of the band of the transmission line.

The similar problem occurs in the recording and reproducing apparatus.

SUMMARY OF THE INVENTION:

It is an object of the present invention to provide a transmitting system which is capable of transmitting data in such a manner that data to be transmitted on a transmission line can be reduced and a stream can be reproduced correctly when it is received.

It is another object of the present invention to provide a recording and reproducing apparatus which is capable of recording and reproducing data in such a manner that data to by recorded in a recording medium can be reduced and the stream ran be reproduced correctly when it is reproduced.

Other objects and advantages of the invention will become apparent from the detailed description that follows. The detailed description and specific embodiments described are provided only for illustration since various additions and modifications within the spirit and scope of the invention will be apparent to those skill in the art from the detailed description.

According to a first aspect of the present invention, in a transmitting system which comprises a transmission line, a transmitting apparatus connected to the transmission line, and a receiving apparatus connected to the transmission line, and transmits data between the transmitting apparatus and the receiving apparatus, the transmitting apparatus comprises: packet compressing means which receives input data comprising plural packers having identifiers as an input, identifies packets to be discarded and effective packets according to the identifiers, and outputs compression information indicating the number of continuously discarded packets and the effective packets to the transmission line, and the receiving apparatus comprises: packet restoring means which receives the compression information and the effective packets which have been output from the transmitting apparatus generates ineffective packets which are as many as the discarded packets, and outputs the ineffective packets and the effective packets. Therefore, it is possible to realize a transmitting system which is capable of reducing data to be transmitted on the transmission line and reproducing the stream correctly when it is received.

According to a second aspect of the present invention, in the transmitting system of the first aspect, the transmitting apparatus further comprises: identifying means which receives, a fixed clock and the input data synchronized with the fixed clock as inputs, identifies the packets to be discarded and the effective packets according to the identifiers, and outputs identification signals each indicating that a packet is either the effective, packet or the packet to be discarded; and counting means for counting the number of continuously discarded packets from the identification signals.

According to a third aspect of the present invention, in the transmitting system of the second aspect, the input data to the transmitting apparatus is a transport stream according to MPEG2, and the identification signals each indicates that the packet is either the packet to be discarded or the effective packet according to the corresponding packet identifier.

According to a fourth aspect of the present invention, in the transmitting system of the third aspect, the output means of the transmitting apparatus inserts the compression information for replacing a continuity counter of an effective packet positioned immediately after the compression information, and the packet restoring means of the receiving apparatus uses data in the continuity counter as the number of the continuously discarded packets, and replaces the continuity counter with the number which increases one by one among the packets of the same packet identifier. Therefore, when transmitting TS packets contained in the MPEG2 transport stream, it is possible to further reduce data to be transmitted.

According to a fifth aspect of the present invention, in the transmitting system of the second aspect, the transmitting apparatus, when the value of the counting means reaches a predetermined value, outputs either the packet to be discarded or the ineffective packet into which the discarded packet has been converted, as the effective packet. Therefore, it is possible to make fixed length data of the number of continuously discarded packets According to a sixth aspect of the present invention, in the transmitting system of the first or second aspect, the receiving apparatus further comprises: a storage for storing the ineffective packets and the effective packets as data and outputting the packets in synchronization with a clock in the order in which the packets are input; and an adaptive clock generating device for outputting the clock so that the amount of the data stored its the storage is kept constant. Therefore, it is possible to reproduce the clock synchronized with the data from the transmitting end.

According to a seventh aspect of the present invention, in the transmitting system of the sixth aspect, the adaptive clock generating device outputs the clock so that the amount of the data stored in the storage when one effective packet is input thereto is kept constant. Therefore, it is possible to reproduce the clock more correctly.

According to an eighth aspect or the present invention, in the transmitting system of the first or second aspect, the receiving apparatus further comprises: a storage for storing the effective packets and the compression information as data and outputting the data in the order as entered; packet restoring means for reading the data from the storage, outputting the ineffective packets when there is no data in the storage and outputting the ineffective packets which are as many as the discarded packets of the number indicated by the compression information and the effective packets when there is data in the storage, the ineffective packets and the effective packets being output in synchronization with the clock; a counter for increasing its value by (the number of the discarded packets indicated by the compression information)×(packet length) when the compression information is input thereto, increasing its value by the packet length of the effective packet when the effective packet is input thereto, and decreasing its value by one when the clock is input thereto; and an adaptive clock generating device for outputting the clock so that the value of the counter is kept constant. Therefore, it is possible to realize a small-scale circuit including a storage of a smaller capacity.

According to a ninth aspect of the present invention, in the transmitting system of the eighth aspect, the adaptive clock generating device outputs the clock so that the value of the counter counted when the effective packet is received is kept constant Therefore, it is possible to reproduce the clock more correctly.

According to a tenth aspect of the present invention, a transmitting apparatus for processing input data and outputting the processed data to a transmission line, comprises: identifying means which receives a fixed clock and an MPEG2 transport stream as input data comprising plural packets having identifiers as inputs, identifies packets to be discarded and effective packets according to the identifiers, and outputs the effective packets and identification signals each according to a packet identifier of either the packet to be discarded or the effective packet; counting means for counting the number of continuously discarded packets from the identification signals; and output means for outputting compression information indicating the number of continuously discarded packets which has been counted by the counting means and the effective packets to the transmission line.

According to an eleventh aspect of the present invention, in the transmitting apparatus of tenth aspect, the output means inserts the compression information for replacing a continuity counter of the effective packet positioned immediately after the compression information.

According to a twelfth aspect of the present invention, a transmitting apparatus for processing input data and outputting the processed data to a transmission line, comprises: identifying means which receives a fixed clock and the input data comprising plural packets having identifiers which is synchronized with the fixed clock as inputs identifies the packets to be discarded and the effective packets according to the identifiers and outputs identification signals each indicating that a packet is either the effective packet or the packet to be discarded; counting means for counting the number of continuously discarded packets from the identification signals; and output means for outputting compression information indicating the number of continuously discarded packets which has been counted by the counting means and the effective packets to the transmission line; the output means outputting either the discarded packet or the ineffective packet into which the discarded packet has been converted, as the effective packet, when the value of the counting means reaches a predetermined value.

According to a thirteenth aspect of the present invention, in a recording and reproducing apparatus which comprises a recording apparatus for processing input data and recording the processed data in a rrecording medium, and a reproducing apparatus for reading the data from the recording medium, the recording appparatus comprises: identifying means which receives a fixed clock and an MPEG2 transport stream as input data comprising plural packets having identifiers which are synchronized with the fixed clock as inputs, identifies packets to be discarded and effective packets according to the identifiers, and outputs the effective packets and identification signals each according to a packet identifier of either the packet to be discarded or the effective packet; counting means which increases its value by one when the idenfification signal indicates that the packet is the packet to be discarded, and outputs its value as compression information and then sets its value to zero when the identification signal indicates that the packet is the effective packet; and recording means which records the compression information output from the counting means and the effective packets in the recording medium; and the reproducing apparatus comprises: packet restoring means which reads the compression information indicating the number of discarded packets and the effective packets from the recording medium, generates ineffective packets as many as the discarded packets, and outputs the ineffective packets and the effective packets. Therefore, it is possible to realize a recording and reproducing apparatus which is capable of recording data to be recorded in the recording medium and reproducing the streanm more correctly when it is reproduced.

According to a fourteenth aspect of the present invention, in the recording and reproducing apparatus of the thirteenth aspect, the recording means of the recording apparatus inserts the compression information for replacing a continuity counter of an effective packet positioned immediately after the compression information, and the packet restoring means of the receiving apparatus uses data is the continuity counter as the number of the continuously discarded packets, and replaces the continuity counter with the number which increases one by one among the packets of the same packet identifier. Therefore, when recording TS packets contained in the MPEG2 transport stream, it is possible to reduce data to be recorded.

According to a fifteenth aspect of the present invention, in a recording and reproducing apparatus which comprises a recording apparatus for processing input data and recording the processed data in a recording medium, and a reproducing apparatus for reading the data from the recording medium, the recording apparatus comprises: identifying means which receives a fixed clock and input data comprising plural packets having identifiers which are synchronized with the fixed clock as inputs, identifies packets to be discarded and effective packets according to the identifiers, and outputs the effective packets and identification signals each indicating that a packet is either the packet to be discarded or the effective packet; counting means which increases its value by one when the identification signal indicates that the packet is the packet to be discarded, and outputs its value as compression information and then sets its value to zero when the identification signal indicates that the packet is the effective packet; and recording means which records the compression information output from the counting means and the effective packets in the recording medium; the recording means recording either the discarded packet or the ineffective packet into which the discarded packet has been converted, as the effective packet, when the value of the counting means reaches a predetermined value; and the reproducing apparatus comprises: packet restoring means which reads the compression information indicating the number of discarded packets and the effective packets from the recording medium, generates ineffective packets as many as the discarded packets, and outputs the ineffective packets and the effective packets.

According to a sixteenth aspect or the present invention, a recording apparatus for processing input data and recording the processed data in a recording medium, comprises: identifying means which receives a fixed clock and an MPEG2 transport stream as input data comprising plural packets having identifiers which is synchronized with the fixed clock as inputs, identifies packets to be discarded and effective packets according to the identifiers, and outputs the effective packets and identification signals each according to a packet identifier of either the packet to be discarded or the affective packet; counting means which increases its value by one when the identification signal indicates that the packet is the packet to be discarded, and outputs its value as compression information and there sets its value to zero when the identification signal indicates that the packet is the effective packet; and recording means which records the compression information output from the counting means and the effective packets in the recording medium.

According to a seventeenth aspect of the present invention, in the recording apparatus of the sixteenth aspect the recording means of the recording apparatus inserts the compression information for replacing a continuity counter of an effective packet positioned immediately after the compression information.

According to an eighteenth aspect of the present invention, a recording apparatus for processing input data and recording the processed data in a recording medium, comprises: identifying means which receives a fixed clock and input data comprising plural packets having identifiers which are synchronized with the fixed clock as inputs, identifies packets to be discarded and effective packets according to the identifiers, and outputs the effective packets and identification signals each indicating that a packet is either the packet to be discarded or the effective packet; counting means which increases its value by one when the identification signal indicates that the packet is the packet to be discarded, and outputs its value as compression information and then sets its value to zero when the identification signal indicates that the packet is the effective packet; and recording means which records the compression information output from the counting means and the effective packets in the recording medium; the recording means recording either the discarded packet or the ineffective packet into which the discarded packet has been converted as the effective packet, when the value of the counting means reaches a predetermined value.

DETAILED DESCRIPTION OF THE PREFERRED EMBODIMENTS

Now, a description viii be given of preferred embodiments of the present invention with reference to FIGS. 1 through 5.

Initially, input data to be processed will be discussed.

Assume that the input data of the present invention comprises a set of packets which are fixed in length and is a stream synchronized with a clock. By way of example, the MPEG2 TS described in the prior art example will be used herein.

Embodiment 1.

Figure 1:
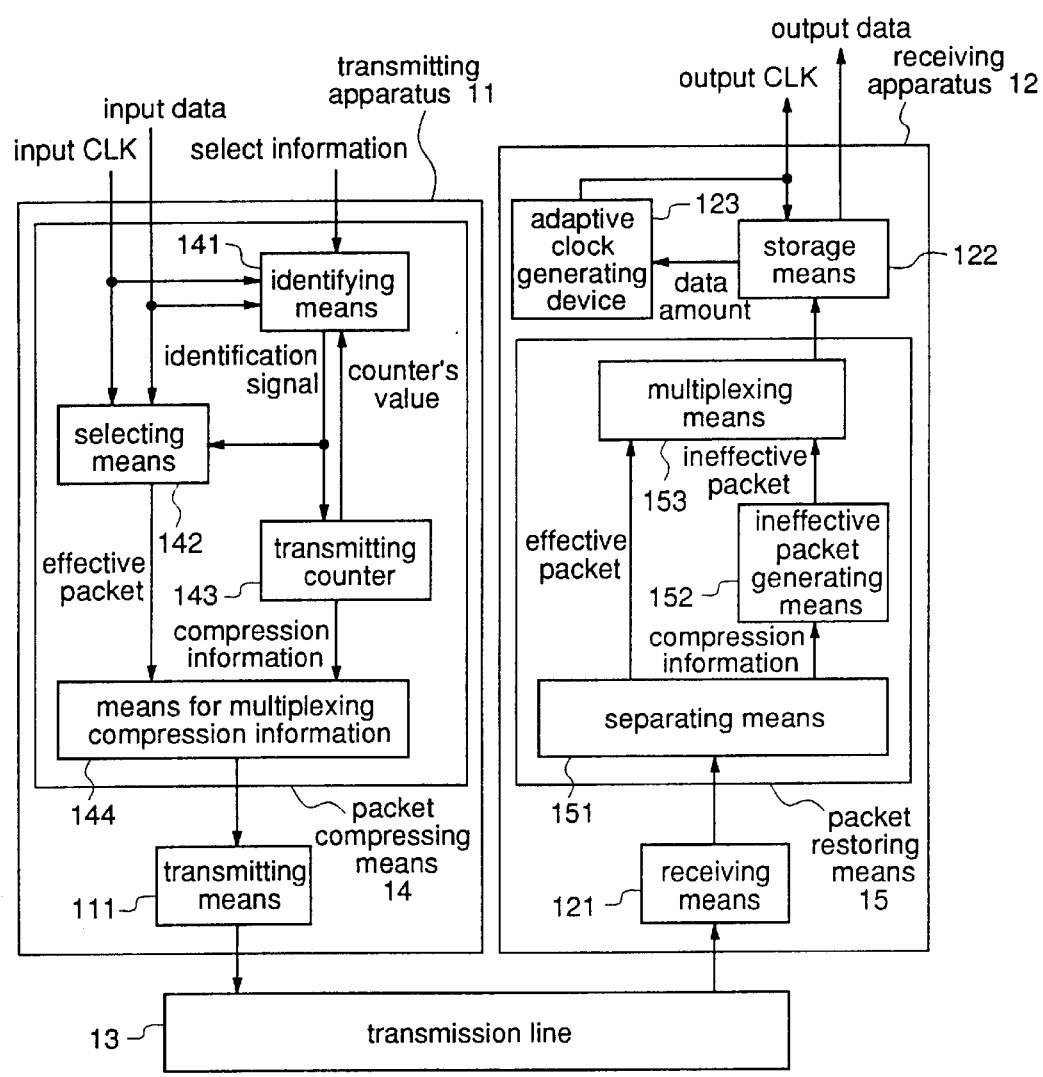
FIG. 1 is a diagram showing a construction of a transmitting system according to a first embodiment of the present invention.

FIG. 1 shows a construction of a transmitting system of the first embodiment. In FIG. 1, reference numerals 11, 12, and 13 designate a transmitting apparatus, a receiving apparatus, and a transmission line, respectively. The transmitting apparatus 11 comprises packet compressing means 14 and transmitting means 111. The packet compressing means 14 comprises identifying means 141, selecting means 142, a transmitting counter 143, and means for multiplexing compression information (multiplexing means) 144. The receiving apparatus 12 comprises packet restoring means 15, receiving means 121, storage means 122, and an adaptive clock generating device 123. The packet restoring means 15 comprises separating means 151, ineffective (null) packet generating means 152, and multiplexing means 153. Hereinafter, a description will be given of operation of the first embodiment with reference to FIG. 1.

First, operation of the transmitting apparatus 11 will be described.

The transmitting apparatus 11 receives an input clock, the MPEG2 TS synchronized with the input clock as input data, and select information as inputs. The select information is used for sorting out TS packets and is composed of one or a plurality of PIDs. According to the select information, the TS packets contained in the input data is separated into effective packets and packets to be discarded. The select information may be a set of PIDs indicating effective packets or a set of PIDs indicating the packets to-be-discarded, and any information will do so long as it can sort out the TS packets. In addition, if it is predetermined that the ineffective (null) packets are always discarded according to fixed PIDs, then the select information may be dispensed with. Besides, a part or all of the select information may be stored in the transmitting apparatus 11 as predetermined (fixed) values. Moreover, the transmitting apparatus 11 may have a table showing correspondences between program numbers and PIDs. In this case, the user specifies a program number, which is converted into the corresponding PID by the transmitting apparatus, and used as the select information.

In the compressing means 14, the identifying means 141 identifies the effective packers and the packets to-be-discarded according to the select information. When the input packet is the effective packet, the identifying means 141 outputs an identification signal indicating that it is the effective packet. On the other hand, when the input packet is the packet to-be-discarded and a counter's value is not smaller than a predetermined value, the identifying means 141 outputs an identification signal indicating that it is the packet to-be-discarded, whereas when the counter's value is larger than the predetermined value, the identifying means 141 outputs an identification signal indicating that it is the effective packet.

The selecting means 142 receives the input clock, the input data, and the identification signals, and outputs the effective packets according to the identification signals. At this time, the packets to-be-discarded are discarded. The transmitting counter 143 receives the identification signal as an input. When the identification signal indicates the "packet to-be-discarded", the counter 143 increases its value by one, and when the identification signal indicates the "effective packet", the counter 143 outputs its value at that point of time as compression information and then sets its value to "0". In other words, the transmitting counter 143 outputs the "number" of continuously discarded packets between the effective packets.

When the multiplexing means 144 receives the effective packet (packets) and the compression information as inputs, it multiplexes these, and outputs the resulting compressed data. In this case, the multiplexing means 144 multiplexes the effective packet (packets) and compression information, for example, by adding the compression information before the effective packet (packets), adding the compression information after the effective packet (packets), or placing the compression information between the effective packets. When the compression information is "0", that is, there is no discarded packets between the effective packets, compression information indicating "0" may be transmitted, or the compression information need not be transmitted. The transmitting method is not limited to these, and any method may be employed so long as positions of the effective packets and the compression information are recognized.

The data length of the compression information is arbitrary. If it is 1 byte, them it can represent 155 continuously discarded packets. In this case, the data length of the compression information is the maximum value of values which the counter 143 might take. When the data length of the compression information is variable, or the data length of the compression information is larger than the number of continuously discarded packets that might be expected, the identifying means 141 need not receive the counter's value, but must output the signal indicating whether the input packet is the effective packet or the packet to-be-discarded.

The packet compressing means 14 thus discards the packers to-be-discarded, and packetizes the compression information indicating the number of the discarded packets and the effective packet (packets) subsequent to the compression information, to generate compressed data (a packet). Other constructions of the packet compressing means 14 may be employed provided that it performs such operation.

The compressed data is output from the packet compressing means 14 and input to the transmitting means 111, which transmits the compressed data though the transmission line 13. As the transmission line 13, an ATM transmission line or an IEEE1394 transmission line may be used. The transmission line 13 may be constructed in different ways so long as it delivers packetized digital data.

Subsequently, a description will be given of operation of the receiving apparatus 12.

The receiving means 121 receives the compressed data on the transmission line 13, and sends it to the packet restoring means 15.

In the packet restoring means 15, the separating means 151 separate, the compressed data into the compression information and the effective packet (packets), and then outputs them separately. Then, the ineffective packet generating means 152 outputs ineffective packets which are as many as the discarded packets of the number indicated by the input compression information. In cases of the MPEG2 TS, the ineffective packets are packets whose PIDs indicate 0x1111. The multiplexing means 13 receives the effective packet (packets) or ineffective packet (packets) as inputs. When there are ineffective packets, the multiplexing means 153 outputs the ineffective (packet) packets and then outputs the effective packet (packets). On the other hand, when there are no ineffective packets, the multiplexing means 153 outputs the effective packet (packets).

The packet restoring means 15 thus receives the compressed data including the compression information and the effective packets as inputs and then outputs ineffective packets of the number indicated by the compression information and the effective packets. In this case, the effective packet positioned after the compression information is output subsequently to the ineffective packets to-be-restored according to the compression information. The construction of the packet restoring means 15 is not limited to that shown in FIG. 1, and other constructions may be employed provided that it performs such operation.

The storage means 122 stores the ineffective packets and the effective packets output from the packet restoring means 15, and outputs the stored packets as output data in the order in which they are input. At this time, the storage means 122 outputs the output data in synchronization with the output clock. The storage means 122 also outputs information indicating data amount stored therein. The adaptive clock generating device 123 adjusts the output clock so that the input data amount is set to the predetermined value. To be specific, when the data amount is larger than the predetermined value, the generating device 123 makes the speed of the output clock higher, while when the data amount is smaller than the predetermined value, the generating device 123 makes the speed lower. Other constructions of the generating device 123 may be employed. For instance, the generating device 123 is implemented by a PLL which operates at a frequency of the input clock. Besides, the generating device 123 may use a clock resource that makes clocks at a rate higher than the input clock of the transmitting apparatus 11, and reduce clocks to be output from the clock resource according to the data amount.

Figure 2:
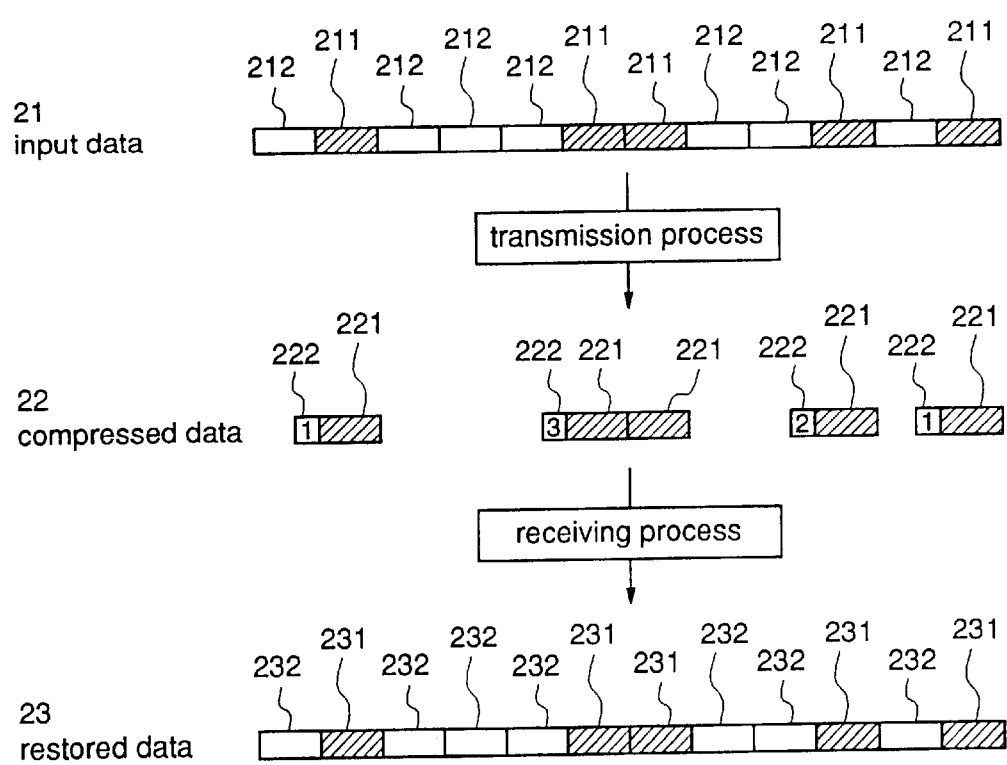
FIG. 2 is a diagram for explaining operation of the transmitting system of the first embodiment.
Figure 3:
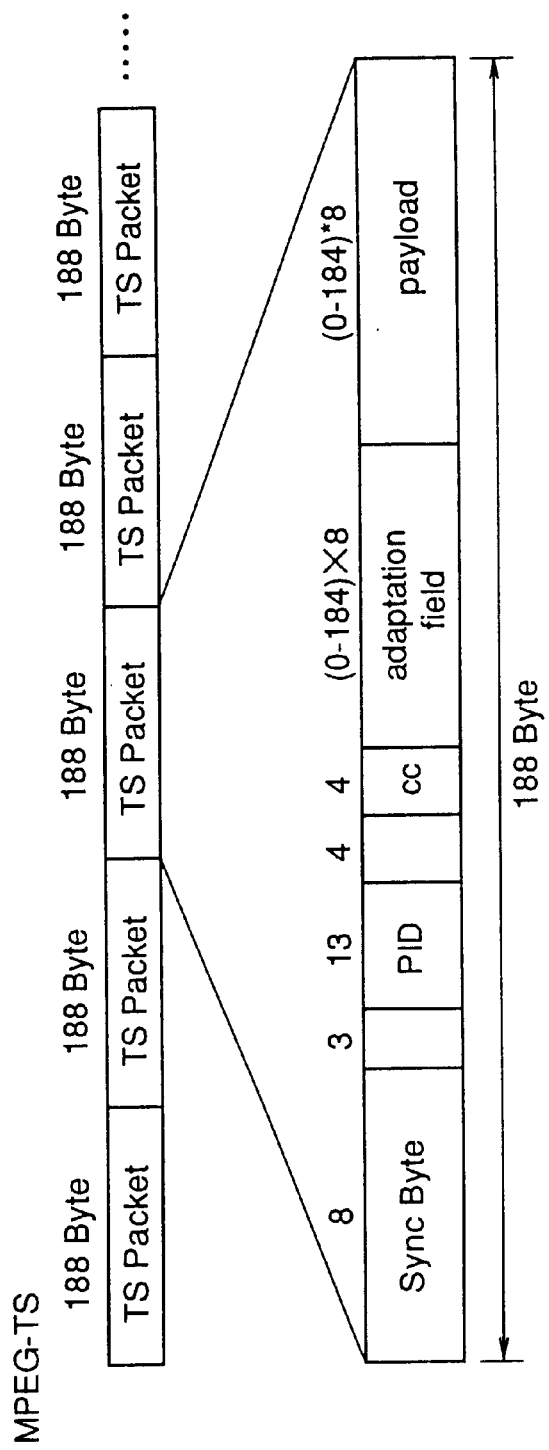
FIG. 3 is a diagram showing a TS according to MPEG2 as input data of the first embodiment.
Figure 3:
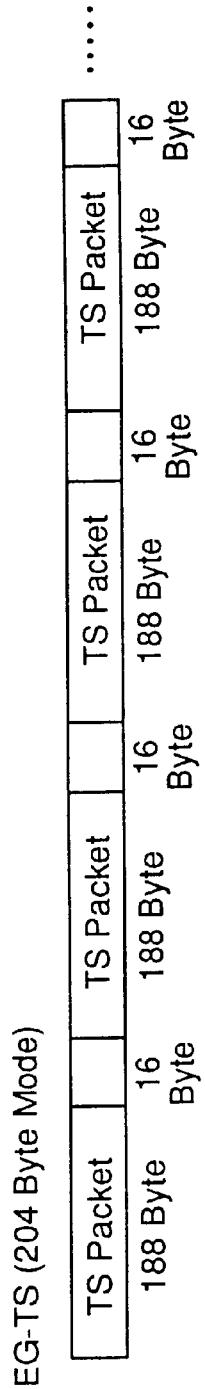

FIG. 2 shows the outline of the processing performed by the transmitting system of the first embodiment. In FIG. 2, reference numeral 21 designates the input data, 22 designates compressed data, 211, 221, and 231 designate the effective packets, 212 designates packets to-be-discarded, 222 designates the compression information, and 232 designates the ineffective packets. Hereinafter, a description will be given of effects of the present invention with reference to FIG. 2.

The transmitting apparatus 11 creates the compressed data 22 from the input data 21. The identifying means 141 identifies the effective packets 211 and the packets to-be-discarded 212. The packet compressing means 14 discards the packets 212 to generate the compressed data 22. The compressed data is composed of the effective packet (packets) 221 and the compression information 222. The effective packets 221 are effective packets 211 of the input data, and the compression information 222 indicates the number of the packets 212 discarded immediately before the effective packet (packets) 221.

The receiving apparatus 12 is adapted to convert the compressed data 22 to the restored data 23. To be specific, the ineffective packets 232 indicated by the compression information 222 are generated, and inserted immediately before the corresponding effective packet (packets) 221. The received effective packets 221 are the effective packets 231. As a result, these ineffective packets 232 and the effective packets 231 are output.

Thus, in accordance with the transmitting system of the first embodiment, the transmitting apparatus 11 discards the packets to-be-discarded and transmits the compression information indicating the number of the continuously discarded packets. Therefore, it is possible to reduce the amount to data and thereby improve transmission efficiency in the use of the transmission line.

In the transmitting apparatus 11 of the transmitting system of the first embodiment, when the value of the counter 143 is larger than the predetermined value, the identifying means 141 outputs the identification signal indicating the "effective packet" regardless of whether or not the packet of the input data is effective or ineffective. The predetermined value is set to the size of the transmission counter 143 to thereby prevent it from overflowing.

The receiving apparatus 12 of the transmitting system of the first embodiment is capable of inserting the ineffective packets which are as many as the discarded packets into the same spots where the discarded packets were placed, according to the compression information. Hence, the data output from the receiving apparatus is equal in amount to the data input to the transmitting apparatus. In addition, the effective packets of the input and output data are disposed in the same position. Therefore, even if some variance of delay might occur at transmission, the adaptive clock generating device 123 can reproduce the clock with case. The time intervals at which the effective packets arrive at a decoder are identical to those of the effective packets in the input data to the transmitting apparatus.

Thus, in accordance with the transmitting system, the transmitting apparatus, and the receiving apparatus of the first embodiment, when transferring data comprising plural packets such as the MPEG2 TS, it is possible to reduce the amount of data, reproduce the transmission clock of the data, and maintain time intervals of required packets contained in the data.

The construction of the packet compressing means 14 is not limited to that shown in FIG. 1 as mentioned previously. Another example of implementation of the packet compressing means 14 will be described following a flowchart in FIG. 4.

Figure 4:
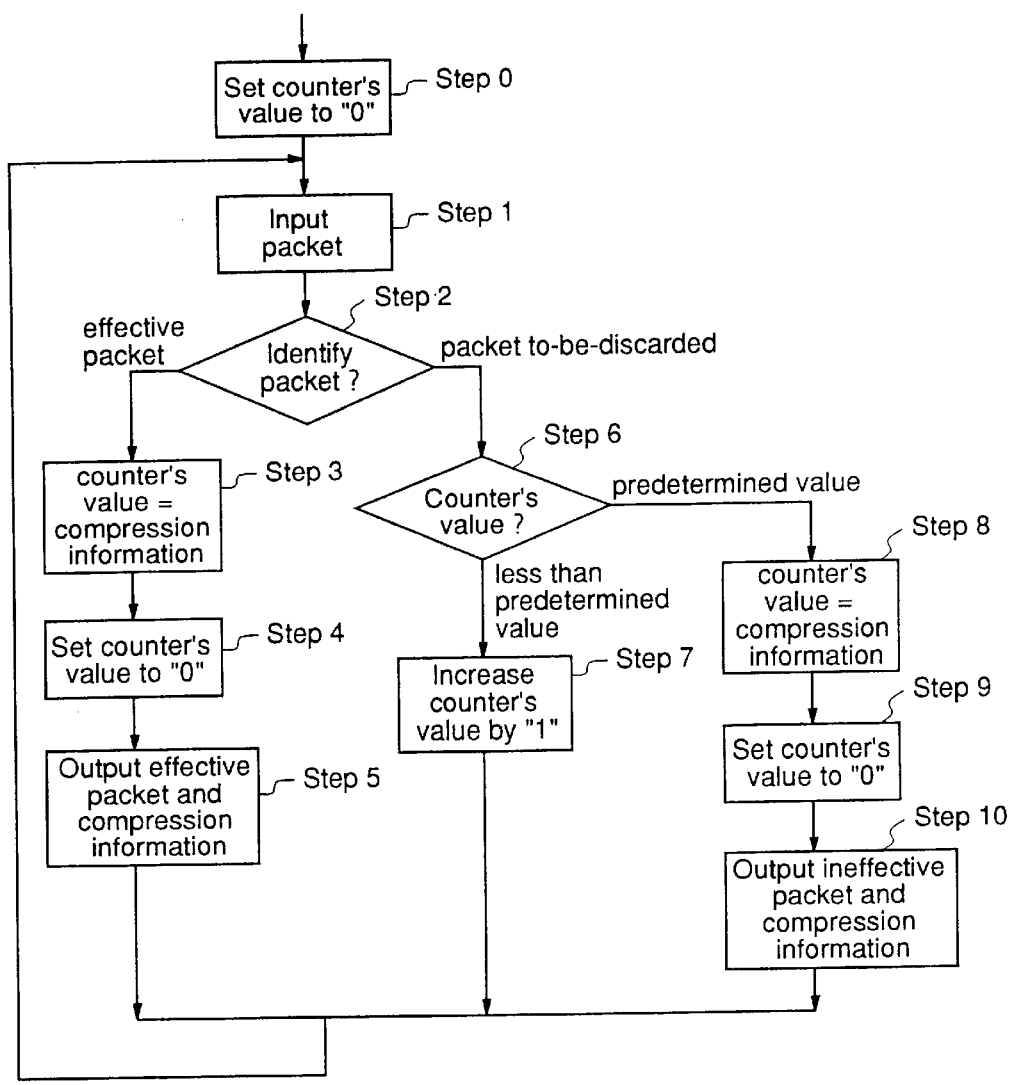
FIG. 4 is a flow chart showing a process for compressing packets performed by a transmitting apparatus according to the first embodiment of the present invention.

Turning now to FIG. 4, in STEP 0, the counter's value is set to "0". The counter herein is a variable for software processing by a CPU, or is a counter device for hardware. In STEP 1, the packet is input. In STEP 2, the type of the packet is identified according to the select information. in STEP 6, when the packet is a packet to-be-discarded, it is decided whether or not the counter's value is the predetermined value. The predetermined value is the maximum value which the counter might take. When decided that the counter's value is less than the predetermined value, in STEP 7, the counter's value is increased by "1". When decided that the counter's value is the predetermined value, in STEP 8, the counter's value is output as the compression information. In STEP 9, the counter's value is set to "0". In STEP 10, the ineffective packets or the effective packets and the compression information are output. When decided that the packet is the effective packet in STEP 2, in STEP 3, the counter's value is output as the compression information. In STEP 4, the counter's value is set to "0". In STEP 5, the effective packet (packets) and the compression information are output. The packet compressing means 15 outputs the effective packet and the compression information in the same manner as the transmitting means 114.

The packet compressing means 14 may be constituted by hardware shown in FIG. 1, may be hardware or may perform computer processing by software provided that it operates following the procedure shown in FIG. 4. The packet compressing means 14 may be constructed in different ways so long as it receives the input data composed of plural packets having PIDs, identifies the effective packets and the packets to-be-discarded according to the PIDs, and outputs the compression information indicating the number of the discarded packets and the effective packets.

The construction of the packet restoring means 15 is not limited to that shown in FIG. 1 as mentioned previously. Another example of implementation of the packet restoring means 15 will be described following a flowchart in FIG. 5.

Figure 5:
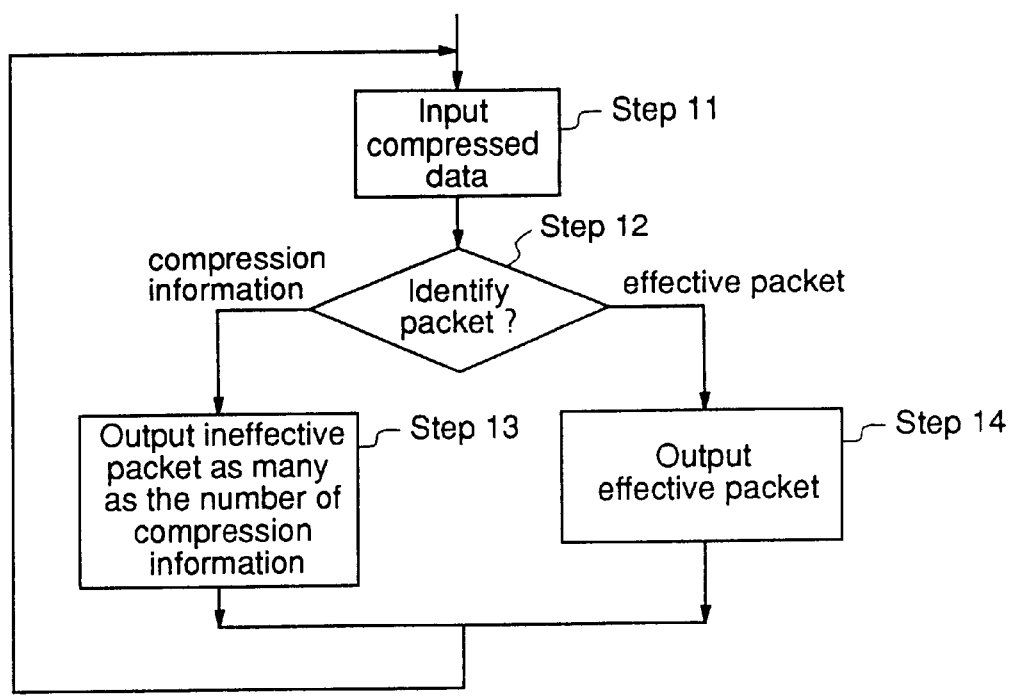
FIG. 5 is a flowchart showing a process for restoring packets performed by a receiving apparatus of the first embodiment.

Turning now to FIG. 5, in STEP 11, the compressed data is input to the packet restoring means 15. In STEP 12, the compression information and the effective packet (packets) are identified. When the compression information is identified in STEP 12, in STEP 13, the ineffective packet (packets) as many as the number indicated by the compression information are output. When the effective packet (packets) is identified in STEP 12, the effective packet (packets) is output in STEP 14.

The packet restoring means 15 may be constituted by hardware shown in FIG. 1, may be hardware, or may perform computer processing provided that it operates following the procedure shown in FIG. 5. The packet restoring means 15 may be constructed in different ways so long as it receives the effective packet and the compression information as inputs, and generates and outputs the ineffective packets as many as the discarded packets.

The input data to be processed is not limited to MPEG TS synchronized with the fixed clock. The present invention is applicable to any stream composed of a set of packets which are fixed in length and can be identified according to the PIDs.

The input data is not limited to the data composed of TS packets (188 byte). In digital broadcasting, a 16-byte error correction code is added to each TS packet of 188 byte in some cases, or a tuner processes the error correction code, and then 16-byte dummy data (insignificant data) is added to the 188-byte packet in other cases. To process such input data, the transmitting apparatus 11 removes the 16-byte error correction code or the dummy data, which results in the 188-byte effective packet. Then, the data restoring means adds the 16-byte dummy data to the 188-byte effective or ineffective packet, to generate 204-byte data. In accordance with this, data can be further compressed. Needless to say, the 204-byte packet may be assumed to be the effective packet. In a case where 188-byte packets and 204-byte packets coexist, flags each indicating "188 byte" or "204 byte" may be added to the respective packets. In accordance with this, the same apparatus can process both of these data.

The select information is not limited to the set of PIDs indicating the effective packets. For instance, a set of PIDs indicating packets to-be-discarded may be used. In addition, it is not always necessary to input the select information to the transmitting apparatus. If fixed selecting conditions are used, all or a part of the select information may be recorded in the transmitting apparatus 11 as fixed values. In addition, packets including PSI (Program Specific Information) may be unconditionally considered as effective packets. In addition, if it is predetermined that ineffective (null) packets are always discarded according to fixed PIDs, the selecting information may be dispensed with. Moreover, the transmitting apparatus 11 may have a table showing correspondences between program numbers and PIDs. In this case, the user specifies a program number, which is converted into the corresponding PID by the transmitting apparatus, and used as the select information. Other select information may be used so long as the TS packets can be sorted out according to the same.

As for the method for transmitting the compression information, instead of using the method for adding the compression information before the TS packet, a method for replacing reproducible information in the TS packet may be employed. For instance, the CC may be replaced by the compression information, which is taken out by the receiving apparatus, and then the CC is reproduced. The CC is 4 bits and can represent 16 continuously discarded packets. When replacing the CC, a duplicated packet is deleted as packets to-be-discarded. In addition, assuming that the lower 1 bit is not replaced, in a case where continuous TS packets have the same PID and their CCs' lower 1 bits have the same value, it is decided that thtat these TS packets contain the same CC when it is reproduced by the receiving apparatus. Further, in a case where transmission is performed on a packet basis on the transmission line and the receiving apparatus need not identify the head of the TS packet according to the Sync Byte, the Sync Byte may be replaced by the compression information. These methods make it possible that the data length is not made larger than the length of the TS packet, and are applicable to arbitrary transmission lines.

The operation of the adaptive clock generating device 123 is not limited to keeping the amout of data in the storage means 122 constant. The generating device 123 may operate in such a way that it keeps the amount of data stored in the storage means 122 when the effective packet is input thereto. The amount of data in the storage means 122 is reduced at a constant rate according to the output clock, and increased when one of the packets of the compressed data is input. Therefore, by using the amount of data at the input of one packet as a criterion, it is possible to output the clock more correctly.

Embodiment 2.

A description will now be given of a receiving apparatus in a transmitting system according to a second embodiment of the present invention with reference to FIG. 6.

Figure 6:
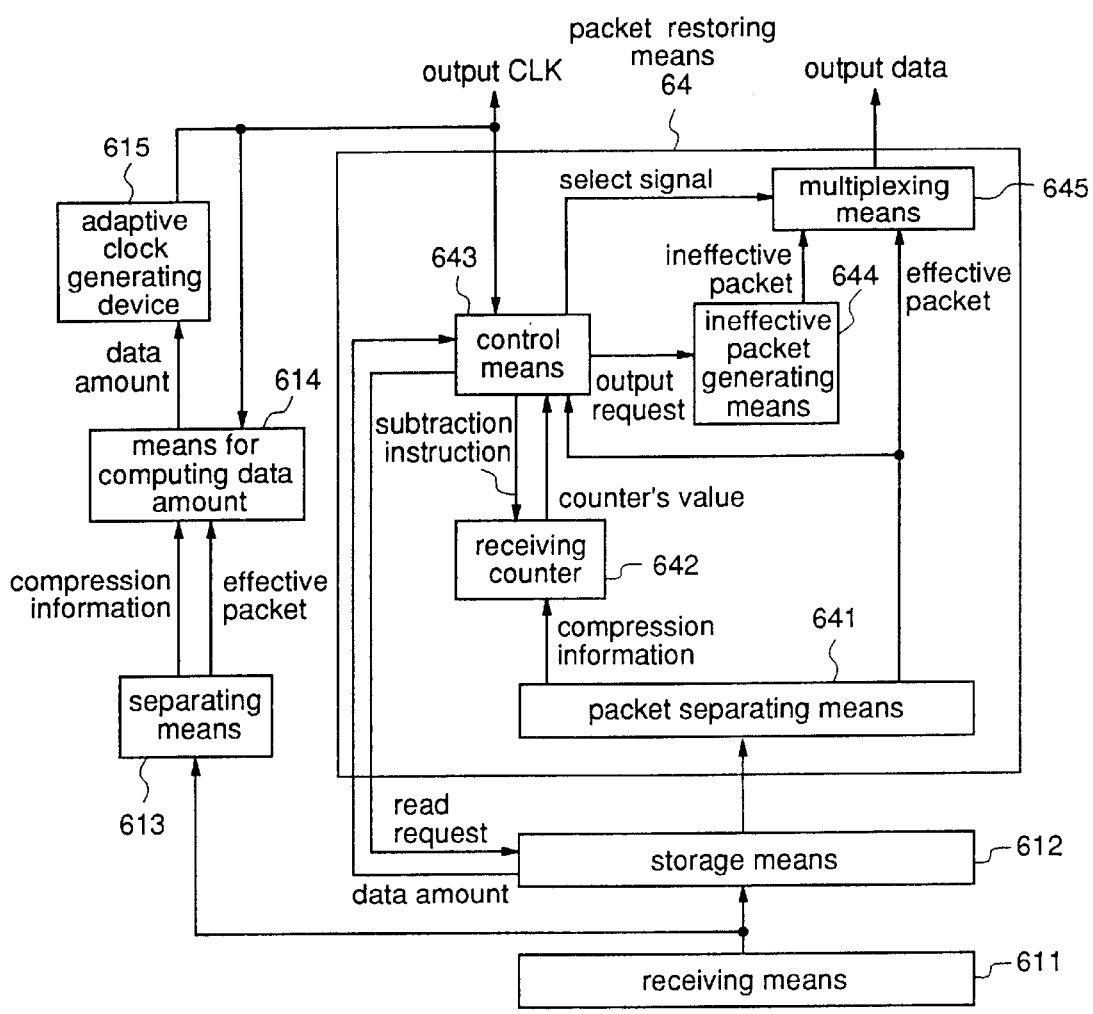
FIG. 6 is a diagram showing a receiving apparatus according to a second embodiment of the present invention.

Turning now to FIG. 6, reference numerals 611, 612, 613, 614, 615, 64, 641, 642, 643, 644, and 645 designate receiving means, storage means, separating means, means for computing data amount (computing means), adaptive clock generating device, packet restoring means, packet separating means, a receiving counter, control means, means for generating ineffective packets (generating means), and multiplexing means, respectively.

The receiving apparatus of this embodiment has replaced the receiving apparatus 12 of the first embodiment, and is adapted to receive the compressed data transmitted from the transmitting means 11.

The receiving means 611 receives the compressed data on the transmission line, which is then stored in the storage means 612. The storage means 612, in response to a read request from the control means 643, outputs the stored data on a first-in, first-out basis. The storage means 612 also outputs "data amount" indicating the amount of data currently stored. The data amount may be the amount of stored data or may be a flag indicating the presence/absence of one or more packets of the compressed data.

The packet restoring means 64 reads one of the compression information or the effective packet (packets) from the storage means 612, and then processes them. The packet separating means 641 separates the input compressed data into the compression information and the effective packet (packets), and outputs them.

The compression information is input to the receiving counter 642. Receiving the compression information, the counter 642 adds its value to the number of the continuously discarded packets of the number indicated by the compression information. When a subtraction instruction is input, the counter 642 decreases its value by one. Assume that the counter 642 can take negative values.

The control means 643 receives the output clock, the data amount, the counter's value, and the effective packet (packets) as inputs. Instead of the effective packet (packets), a flag indicating the presence/absence of the effective packets may be input. The control means 643, operates on a packet-time basis indicated by the output clock.

The control means 643, when the counter's value is "0" and the data amount indicates there is one or more compressed data, outputs a read request to the storage means 612. When the counter's value is not smaller than "1" as a result of reading, the control means 643 outputs a select signal indicating the "ineffective packet" to the multiplexing means 645, outputs the output request to the ineffective packet generating means 644, and outputs the subtraction instruction to the counter 642 for directing it to decrease its value by one. When the separating means 641 outputs the effective packet as a result of reading, the control means 643 outputs the select signal indicating the "effective packet" to the multiplexing means 645.

The control means 643, when the counter's value is "0", and the data amount indicating that there is no compressed data, outputs a select signal indicating the "ineffective packet" to the multiplexing means 645, outputs the output request to the ineffective packet generating means 644, and outputs the subtraction instruction to the counter 642 for directing it to decrease its value by one.

The control means 643, when the counter's value is not smaller than "1", outputs a select signal indicating the "ineffective packet" to the multiplexing means 645, outputs the output request to the ineffective packet generating means 644, and outputs the subtraction instruction to the counter 642 for directing it to decrease its value by one.

Receiving the output request, the ineffective packet generating means 644 outputs the ineffective packet. The multiplexing means 645 outputs the ineffective or effective packet according to the select signal.

When the separating means 613 receives the compressed data input from the receiving means, it outputs the compression information and the effective packet (packets) to the computing means 614. The computing means 614, when the compression information is input thereto, increases its value by ((the number of the continuously discarded packets indicated by the compression information)×packet length), and when the effective packet is input thereto, it increases its value by the packet length. The computing means 614 also decreases the value according to the output clock. The adaptive clock generating device 615 outputs the clock so that the amount of data in the computing means 614 is kept constant. To be specific, when the counter's value is larger than the predetermined value, the generating device 615 makes the speed of the output clock higher, while when the counter's value is smaller than the predetermined value, it makes the speed lower. If the generating device 615 controls the output clock so that the amount of data increased as a result of the input of the effective packet to the computing means 614 is kept constant, then the clock can be responded more correctly.

Thus, in accordance with the second embodiment, since the compression information before generating the ineffective packets is stored in the storage, the same effects provided by the transmitting system of the first embodiment is attained with the storage of a smaller capacity, in contrast with the receiving apparatus of the first embodiment.

The construction of the computing means 614 is not limited to that of this embodiment. For instance, when one compression information is always present before one effective packet, the computing means 614 may receive only the compression information as an input, and may increase its value by ((the numbers of the continuously discarded packets indicated by the compression information)×packet length). This realizes a simpler construction.

In addition, the construction of the packet restoring means 64 is not limited to that shown in FIG. 6. The other construction may be employed so long as the packet restoring means 64 reads the effective packets and the compression information indicating the number of the discarded packets from the storage means, outputs the effective packets and the ineffective packets of the number indicated by the compression information, and outputs the ineffective packets when there is no data in the storage means and outputs ((the ineffective packets of the number indicated by the following compression information) minus (the number of these output ineffective packets)).

Embodiment 3.

Hereinafter, a description will be given of a recording and reproducing apparatus according to a third embodiment of the present invention with reference to FIG. 7.

Figure 7:
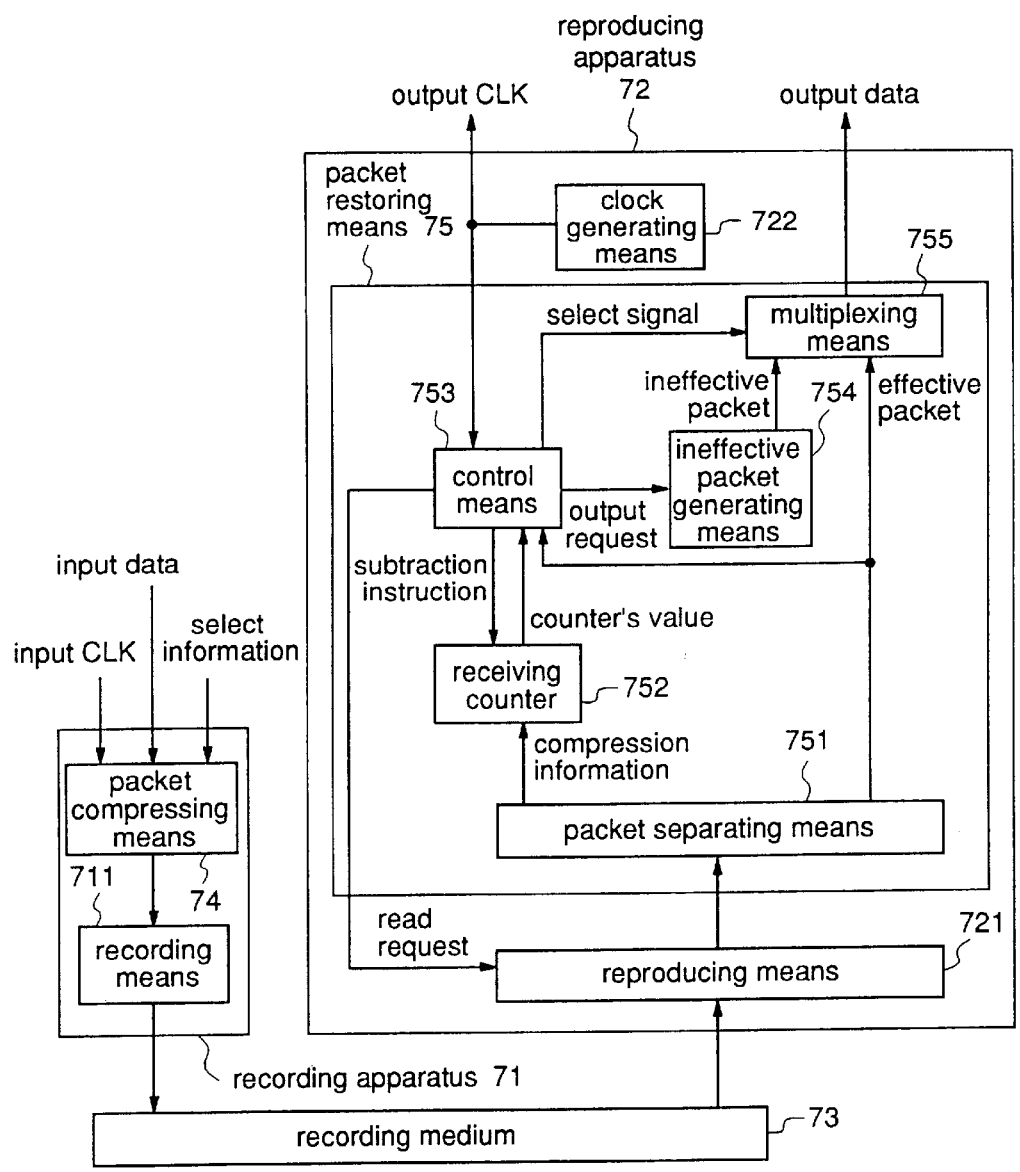
FIG. 7 is a diagram showing a recording and reproducing apparatus according to a third embodiment of the present invention.
Figure 8:
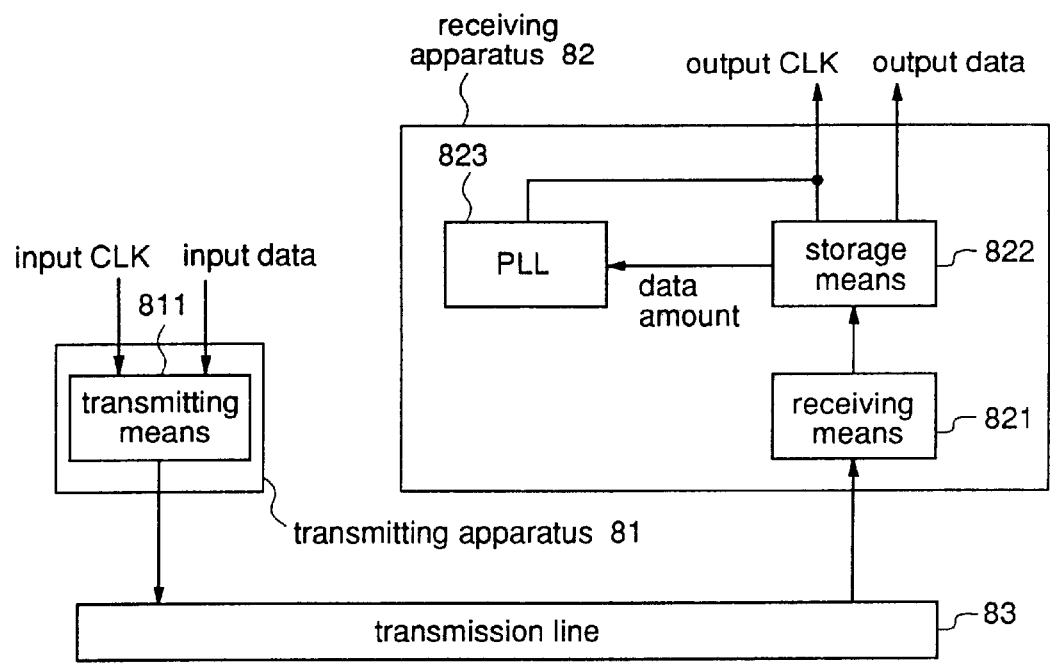
FIG. 8 is a diagram showing a prior art transmitting system.

In FIG. 7, reference numerals 71, 72, and 73 designate a recording apparatus, a reproducing apparatus, and a recording medium, respectively. The recording apparatus 71 comprises recording means 711, and packet compressing means 74. The reproducing apparatus 72 comprises reproducing means 721, clock generating means 722, and packet restoring means 75. The packet restoring means 75 comprises packet separating means 751, a receiving counter 752, control means 753, ineffective packet generating means 754, and multiplexing means 755.

Operation of the recording apparatus 71 will be described.

The operation of the packet compressing means 74 of the recording apparatus 71 is identical to that of the packet compressing means 14 of the transmitting apparatus of the first embodiment, and therefore, will not be discussed herein. The compressed data output from the packet compressing means 74 is recorded in the recording medium 73 by the recording means 711.

As the recording medium, an optical disc, an optical magnetic disc, a hard disc, a memory, a magnetic tape, and so forth are available.

The operation of the reproducing apparatus 72 will be described.

The reproducing means 721, in response to a read request from the packet restoring means 75, reads data from the recording medium 73.

The construction of the packet restoring means 75 is almost identical to that of the packet restoring means 64 of the second embodiment, and difference between them is that the packet restoring means 64 outputs ineffective (packet) packets when there is no compressed data but the packet restoring means 75 will not output data when there is no compressed data. The difference will be described below. The operation of each means which will not be described herein is identical to that of each means of the packet restoring means 64 of the second embodiment.

While the receiving counter 642 of the second embodiment may take negative values, the receiving counter 752 of the third embodiment takes only positive values. While the control means 643 of the second embodiment receives the data amount and performs control according to the data amount, the control means 753 does not perform control according to the data amount. The control means 753 receives the output clock, the counter's value, and the effective packet (packets) as inputs, and operates on a packet-time basis indicated by the output clock. When the counter's value is "0", the control means 753 outputs a read request to the reproducing means 721. When the counter's value is "1" or more, the control means 753 outputs a select signal indicating the "ineffective packet", outputs an output request to the ineffective packet generating mans 754, and outputs a subtraction instruction to the receiving counter 752 for directing it to decrease its value by one. When the separating means 751 outputs the effective packet to the multiplexing means 755, the control means 753 outputs the select signal indicating the "effective packet" to the multiplexing means 755.

On the other hand, when the counter's value is "1" or more, the control means 753 outputs the select signal indicating the "ineffective packet" to the multiplexing means 755, outputs the output request to the ineffective packet generating means 754, and outputs the subtraction instruction to the receiving counter 752 for directing it to decrease its value by one.

The clock generating means 722 outputs a clock at the speed almost as high as that of a clock input to the recording apparatus 71.

As should be appreciated from the foregoing description, when recording data comprising plural packets such as the MPEG TS input in synchronization with the fixed clock, it is possible to reduce the recording capacity. Besides, since the data length of the input data is identical to that of the output data and the effective packets are present in the same spots in these data, correctly decoded data can be reproduced.

The construction of the packet restoring means 75 of the third embodiment is not limited to that shown in FIG. 7. The other constructions may be employed so long as the packet restoring means 75 reads the effective packets and the compression information indicating the number of the discarded packets from the storage, and outputs the ineffective packets of the number indicated by the compression information and the effective packets.

What is claimed is:

1. A transmitting system comprising:
a transmission line, a transmitting apparatus connected to said transmission line, and a receiving apparatus connected to said transmission line, wherein data is transmitted between said transmitting apparatus and said receiving apparatus, and wherein:
said transmitting apparatus receives input data comprising plural packets having identifiers which identify packets to be discarded and effective packets as an input, identifies packets to be discarded and effective packets according to the identifiers, and outputs compression information indicating a number of continuously discarded packets and the effective packets to said transmission line;
said transmitting apparatus comprises:
an identifying means which identifies the packets to be discarded and the effective packets according to the identifiers, and outputs the effective packets and identification signals each indicating that a corresponding packet is either the effective packet or the packet to be discarded; and
a counting means for counting the number of continuously discarded packets from the identification signals, wherein:
said transmitting apparatus, when a value of said counting means reaches a predetermined value, outputs either the packet to be discarded or the ineffective packet into which the discarded packet has been converted; and
said receiving apparatus receives data comprising the compression information and the effective packets which have been output from said transmitting apparatus, generates ineffective packets of the number indicated by the compression information, and outputs the ineffective packets and the effective packets according to clocks generated from the data.

2. A transmitting system comprising:
a transmission line, a transmitting apparatus connected to said transmission line, and a receiving apparatus connected to said transmission line, wherein data is transmitted between said transmitting apparatus and said receiving apparatus, and wherein:
said transmitting apparatus receives input data comprising plural packets having identifiers which identify packets to be discarded and effective packets as an input, identifies packets to be discarded and effective packets according to the identifiers, and outputs compression information indicating a number of continuously discarded packets and the effective packets to said transmission line; and
said receiving apparatus receives the compression information and the effective packets which have been output from said transmitting apparatus, generates ineffective packets of the number indicated by the compression information, and outputs the ineffective packets and the effective packets according to clocks generated from the data; and
said receiving apparatus comprises:
a storage for storing the ineffective packets and the effective packets as data and outputting the packets in synchronization with clocks in the order in which the packets are input; and
an adaptive clock generating device for outputting the clocks so that the amount of the data stored in said storage is kept constant;
wherein said adaptive clock generating device outputs the clocks so that the amount of the data stored in said storage when effective packets are input thereto is kept constant.

3. A transmitting apparatus for processing input data and outputting the processed data to a transmission line, said transmitting apparatus comprising:
an identifying means which receives input data comprising plural packets having identifiers for identifying packets to be discarded and effective packets as input data, identifies the packets to be discarded and the effective packets according to the identifiers, and outputs identification signals each indicating that a corresponding packet is either the effective packet or the packet to be discarded;
a counting means for counting the number of continuously discarded packets from the identification signals; and
an output means for outputting compression information indicating the number of continuously discarded packets which has been counted by said counting means and the effective packets to the transmission line;

wherein said output means outputs either the discarded packets or the ineffective packet into which the discarded packet has been converted when the value of said counting means reaches a predetermined value.

4. A transmitting system comprising:

a transmission line, a transmitting apparatus connected to said transmission line, and a receiving apparatus connected to said transmission line, wherein data is transmitted between said transmitting apparatus and said receiving apparatus, and wherein:

said transmitting apparatus receives input data an MPEG2 transport stream containing a set of packets identified by PID as an input, identifies packets to be discarded and effective packets according to the PID, and outputs compression information indicating a number of continuously discarded packets and the effective packets to said transmission line;

said receiving apparatus receives data comprising the compression information and effective packets which have been output from said transmitting apparatus, generates ineffective packets of the number indicated by the compression information, and outputs the ineffective packets and the effective packets according to clocks generated from the data;

said transmitting apparatus inserts the compression information for replacing a continuity_counter of an effective panel placed immediately after the compression information; and said receiving apparatus uses data in the continuity_counter as the number of the continuously discarded packets, and replaces the continuity_counter with the number which increases one by one among the packets of the same PID.

5. A transmitting system comprising:

a transmission line, a transmitting apparatus connected to said transmission line, and a receiving apparatus connected to said transmission line, wherein data is transmitted between said transmitting apparatus and said receiving apparatus, and wherein:

said transmitting apparatus receives input data comprising an MPEG2 transport stream containing a set of packets identified by PID as an input, identifies packets to be discarded and effective packets according to the PID, and outputs compression information indicating a number of continuously discarded packets and the effective packets to said transmission line; and said receiving apparatus receives data comprising the compression information and the effective packets which have been output from said transmitting apparatus, generates ineffective packets of the number indicated by the compression information, and outputs the ineffective packets and the effective packets according to clocks generated from the data, wherein said receiving apparatus comprises:

a storage for storing the ineffective packets and the effective packets as data and outputting the packets in synchronization with clocks in the order in which the packets are input; and an adaptive clock generating device for outputting the clocks so that the amount of the data stored in the storage is kept constant.

6. A transmitting system comprising:

a transmission line, a transmitting apparatus connected to said transmission line, and a receiving apparatus connected to said transmission line, wherein data is transmitted between said transmitting apparatus and said receiving apparatus, and wherein:

said transmitting apparatus receives input data comprising plural packets having identifiers and select information indicating that each of the plural packets is an effective packet or a packet to be discarded according to the identifiers provided to the plural packets as input data, identifies packets to be discarded and effective packets according to the identifiers, and outputs compression information indicating the number of continuously discarded packets and the effective packets to said transmission line; and said receiving apparatus receives data comprising the compression information and the effective packets which have been output from said transmitting apparatus, generates ineffective packets of the number indicated by the compression information, and outputs the ineffective packets and the effective packets according to clocks generated from the data, wherein said receiving apparatus comprises:

a storage for storing the ineffective packets and the effective packets as data and outputting the packets in synchronization with clocks in the order in which the packets are input; and an adaptive clock generating device for outputting the clocks so that the amount of the data stored in said storage is kept constant.

* * * * *

UNITED STATES PATENT AND TRADEMARK OFFICE
CERTIFICATE OF CORRECTION

PATENT NO. : 6,577,813 B1
DATED : June 10, 2003
INVENTOR(S) : Susumu Ibaraki et al.

It is certified that error appears in the above-identified patent and that said Letters Patent is hereby corrected as shown below:

<u>Title page,</u>
Item [56], OTHER PUBLICATIONS, "Database WPI," reference, after "GB;" insert
-- Class TO3, --.
Item [57], ABSTRACT,
Line 32, after the word "ineffective" delete ",".

<u>Column 17,</u>
Line 11, after "input data", insert -- comprising --.
Line 19, after "information and", insert -- the --.
Line 27, replace "panel" with -- packet --.

Signed and Sealed this

Thirtieth Day of December, 2003

JAMES E. ROGAN
*Director of the United States Patent and Trademark Office*